(12) United States Patent
Ban

(10) Patent No.: US 10,861,191 B2
(45) Date of Patent: Dec. 8, 2020

(54) APPARATUS AND METHOD FOR CALIBRATING DRIVER MONITORING CAMERA

(71) Applicant: HYUNDAI MOBIS CO., LTD., Seoul (KR)

(72) Inventor: Kyu Dae Ban, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 0 days.

(21) Appl. No.: 16/582,080

(22) Filed: Sep. 25, 2019

(65) Prior Publication Data

US 2020/0134870 A1 Apr. 30, 2020

(30) Foreign Application Priority Data

Oct. 25, 2018 (KR) .................. 10-2018-0128011

(51) Int. Cl.
*G06T 7/80* (2017.01)

(52) U.S. Cl.
CPC ...... *G06T 7/80* (2017.01); *G06T 2207/30201* (2013.01)

(58) Field of Classification Search
CPC ... G06T 7/80; G06T 7/85; G06T 2207/30201; G06K 9/00845; G06K 9/00228; G05D 1/0246; B60N 2/002; B60R 21/01538
See application file for complete search history.

(56) References Cited

U.S. PATENT DOCUMENTS

| | | | | |
|---|---|---|---|---|
| 2009/0279786 | A1* | 11/2009 | Kasugai | G06K 9/00248 382/195 |
| 2010/0321489 | A1* | 12/2010 | Chen | G01S 5/16 348/116 |
| 2012/0188355 | A1* | 7/2012 | Omi | A61B 5/1114 348/78 |
| 2015/0294169 | A1* | 10/2015 | Zhou | G06F 3/013 348/148 |
| 2018/0373250 | A1* | 12/2018 | Nakamura | G06K 9/00228 |

* cited by examiner

Primary Examiner — Thai Q Tran
Assistant Examiner — Jose M Mesa
(74) Attorney, Agent, or Firm — Knobbe Martens Olson & Bear LLP

(57) ABSTRACT

An apparatus for calibrating a driver monitoring camera may include: a camera configured to capture an image of a driver's face; a control unit configured to receive the captured image from the camera, and detect the face to determine a face position; and a display unit configured to display the determination result of the face position by the control unit.

16 Claims, 5 Drawing Sheets

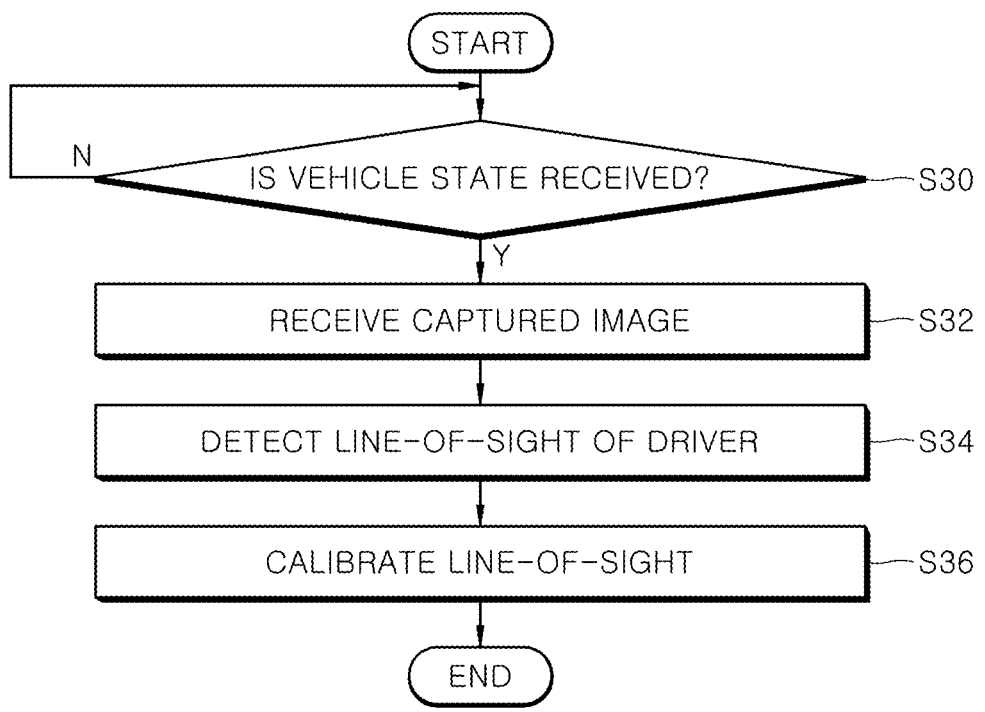

APPARATUS AND METHOD FOR CALIBRATING DRIVER MONITORING CAMERA

CROSS-REFERENCES TO RELATED APPLICATIONS

The present application claims priority to Korean application number 10-2018-0128011, filed on Oct. 25, 2018, which is incorporated by reference in its entirety.

BACKGROUND OF THE INVENTION

The present invention relates to an apparatus and method for calibrating a driver monitoring camera, and more particularly, to an apparatus and method for calibrating a driver monitoring camera, which can not only display a face detection state of a driver through a camera to adjust the position of the camera, but also decide extrinsic parameters of the camera based on an image of the background in the vehicle, and automatically calibrate a line-of-sight according to a vehicle state during driving.

In general, a driver state monitoring device acquires an image of a driver through a camera, analyzes the acquired image, and recognizes a driver state using signals of various manipulation devices such as a brake and a steering switch. The driver state monitoring device may warn the driver against the driver state (for example, dozing at the wheel), such that the driver can stably drive the vehicle.

Such a driver state monitoring device includes a camera capable of capturing an image of the front of the driver. For example, the camera may be mounted in a cluster or mounted at the top of a steering wheel or on a room mirror inside the vehicle.

In particular, when the camera is mounted on the steering wheel, the face of the driver or an object may be cut by the edge of an image capture through the camera, depending on the seated state of the driver and the tilting angle of the steering wheel. Therefore, the driver state monitoring device may not normally recognize the state of the driver, and thus not operate or malfunction.

Furthermore, since the field of view and the mounting position of the camera are limited, the face of the driver may be cut by the edge of an image, depending on the posture of the driver, when the image is captured.

The related art of the present invention is disclosed in Korean Patent No. 10-1684032 published on Dec. 7, 2016 and entitled "Driver State Monitoring Apparatus and Method for Correcting Position of Camera thereof".

As such, when the face of the driver is detected through the camera, the face of the driver may be cut by the edge of the image. In this case, the state of the driver cannot be monitored. When the driver adjusts the tilting angle of the steering wheel, the relationship between a camera coordinate system and a vehicle coordinate system may be changed from before.

SUMMARY OF THE INVENTION

Embodiments of the present invention are directed to an apparatus and method for calibrating a driver monitoring camera, which can not only display a face detection state of a driver through a camera to adjust the position of the camera, but also decide extrinsic parameters of the camera based on an image of the background in the vehicle, and automatically calibrate a line-of-sight according to a vehicle state during driving.

In one embodiment, an apparatus for calibrating a driver monitoring camera may include: a camera configured to capture an image of a driver's face; a control unit configured to receive the captured image from the camera, and detect the face to determine a face position; and a display unit configured to display the determination result of the face position by the control unit.

The apparatus may further include a reflecting body installed on a front surface of a lens of the camera.

The display unit may display a vertical position depending on the face position.

The control unit may detect features of background from the captured image, estimate the position and angle of the camera, and calibrate an extrinsic parameter of the camera.

The features of the background may include one or more of a window frame, a roof, a B-pillar, a handle and a fixed structure of the vehicle.

The extrinsic parameter of the camera may indicate the relationship between a vehicle coordinate system and a camera coordinate system.

The apparatus may further include a vehicle state input unit configured to input a vehicle state. The control unit may detect a line-of-sight of the driver from the captured image when a direction indication state or a vehicle speed state is inputted from the vehicle state input unit, and calibrate the line-of-sight according to the vehicle state.

The control unit may calibrate the line-of-sight in an indication direction when the vehicle state is the direction indication state.

The control unit may calibrate the line-of-sight in a forward-looking direction when the vehicle state is the vehicle speed state equal to or more than a preset vehicle speed.

In another embodiment, a method for calibrating a driver monitoring camera may include: receiving, by a control unit, a captured image from a camera; detecting, by the control unit, a face from the captured image; determining, by the control unit, the position of the detected face; and displaying, by the control unit, the determination result on a display unit according to the position of the detected face.

In the displaying of the determination result, the control unit may display a vertical position depending on the position of the face.

In another embodiment, a method for calibrating a driver monitoring camera may include: receiving, by a control unit, a captured image from a camera; detecting, by the control unit, features of background from the captured image; estimating, by the control unit, the position and angle of the camera based on the features of the background; and calibrating, by the control unit, an extrinsic parameter of the camera according to the position and angle of the camera.

The extrinsic parameter of the camera may indicate the relationship between a vehicle coordinate system and a camera coordinate system.

The features of the background may include one or more of a window frame, a roof, a B-pillar, a handle and a fixed structure of the vehicle.

In another embodiment, a method for calibrating a driver monitoring camera may include: determining, by a control unit, a vehicle state and receiving a captured image from a camera; detecting, by the control unit, a line-of-sight of a driver from the captured image; and calibrating, by the control unit, the line-of-sight of the driver according to the vehicle state.

The vehicle state may be a direction indication state or a vehicle speed state.

The calibrating of the line-of-sight of the driver may include calibrating, by the control unit, the line-of-sight in the indication direction, when the vehicle state is the direction indication state.

The calibrating of the line-of-sight of the driver may include calibrating, by the control unit, the line-of-sight in a forward-looking direction, when the vehicle state is the vehicle speed state equal to or more than a preset vehicle speed.

In accordance with the embodiments of the present invention, the apparatus and method for calibrating a driver monitoring camera may display the face detection state of the driver through the camera such that the driver can conveniently adjust the position of the camera while checking the face detection state.

Furthermore, the apparatus and method may calibrate the extrinsic parameters of the camera based on the background image of the interior of the vehicle, captured through the camera, thereby not only conveniently calibrating the relationship between the camera coordinate system and the vehicle coordinate system without a complicated procedure, but also automatically calibrating the line-of-sight of the driver according to the vehicle state during driving.

BRIEF DESCRIPTION OF THE DRAWINGS

FIG. 5 is a flowchart for describing a method for calibrating a driver monitoring camera in accordance with a third embodiment of the present invention.

DESCRIPTION OF SPECIFIC EMBODIMENTS

Hereafter, an apparatus and method for calibrating a driver monitoring camera in accordance with an embodiment of the present invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
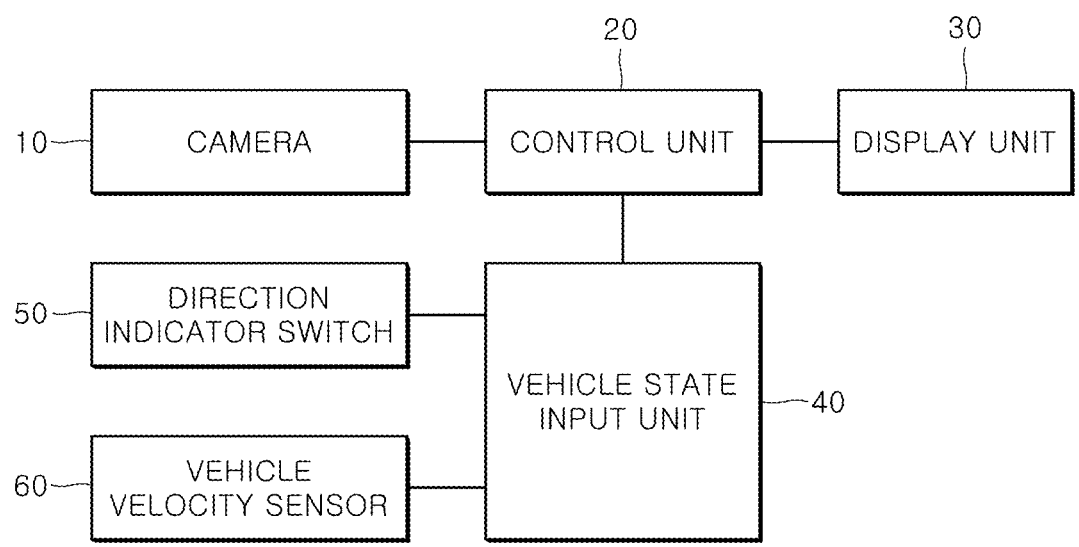
FIG. 1 is a block diagram illustrating an apparatus for calibrating a driver monitoring camera in accordance with an embodiment of the present invention.
Figure 2:
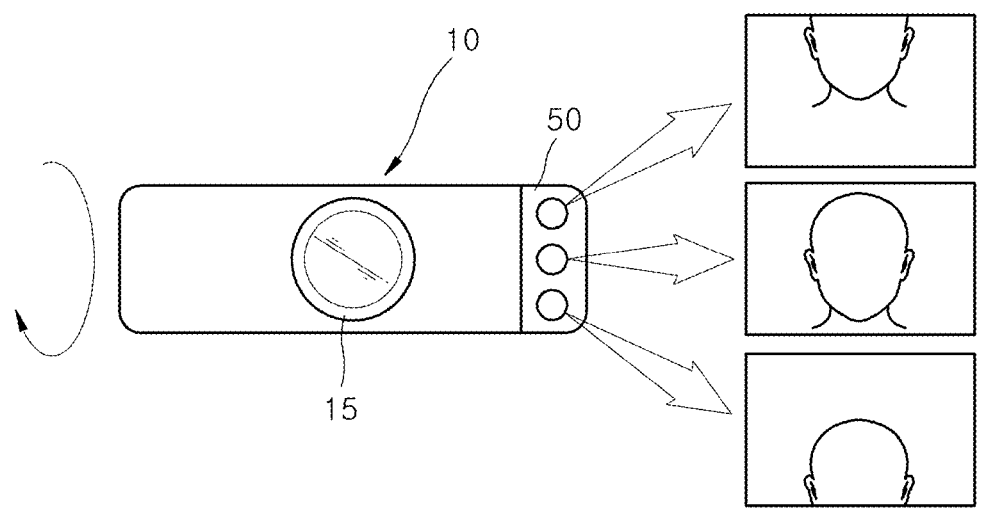
FIG. 2 is a configuration diagram illustrating a camera with a display unit in the apparatus for calibrating a driver monitoring camera in accordance with the embodiment of the present invention.

FIG. 1 is a block diagram illustrating an apparatus for calibrating a driver monitoring camera in accordance with an embodiment of the present invention, and FIG. 2 is a configuration diagram illustrating a camera with a display unit in the apparatus for calibrating a driver monitoring camera in accordance with the embodiment of the present invention.

As illustrated in FIG. 1, the apparatus for calibrating a driver monitoring camera in accordance with the embodiment of the present invention may include a camera 10, a control unit 20 and a display unit 30, and further include a vehicle state input unit 40.

A driver carelessness sensing system or a driver monitoring system such as a driver state monitoring device may capture an image of the face of a driver through the camera 10, detect the closed eyes, face angle and line-of-sight of the driver based on the captured image, and sense careless driving such as dozing at the steering wheel or negligence in keeping eyes forward.

In the present embodiment, the camera 10 may capture an image of the face of the driver, and provide the captured image to the control unit 20 to calibrate the camera 10.

The control unit 20 may receive the captured image from the camera 10, detect the face to determine the position of the face, and output the determination result such that the driver can adjust the angle of the camera 10.

The display unit 30 may display the determination result of the face position determined by the control unit 20.

For example, as illustrated in FIG. 2, the display unit 30 may include a plurality of LEDs each configured to display a vertical position depending on the face position.

Therefore, the driver may adjust the angle of the camera 10 while checking whether the face is positioned in the center of the image captured through the camera 10 or positioned at the top or bottom of the image, based on the turn-on state of the LED displayed on the display unit 30.

Alternatively, the detected face of the driver may be displayed on a display such as a navigation system, serving as the display unit 30, such that the driver can adjust the angle of the camera 10 while checking the captured image.

As illustrated in FIG. 2, the camera 10 may further include a reflecting body 15 installed on the front surface of the lens thereof, such that the driver can adjust the angle of the camera 10 while checking his/her face reflected from the reflecting body 15.

At this time, as the reflecting body 15, a near-infrared ray filter may be employed and utilized as a mirror, or a mirror may be attached around the front surface of the lens.

The control unit 20 may detect features of the background from the captured image, and estimate the position and angle of the camera 10 to calibrate extrinsic parameters of the camera 10.

The features of the background may include one or more of a window frame, roof, B pillar, handle and fixed structure of the vehicle. When the features are detected as fixed structures in the vehicle through image processing, the angle of the camera 10 may be recognized.

Therefore, the relationship between a vehicle coordinate system and a camera coordinate system which are the extrinsic parameters of the camera 10 may be calibrated based on the detected features.

When the camera 10 is mounted at an internal position of the vehicle such as the top of the steering column, where the camera 10 can be moved, or when the camera 10 is mounted at a position such as the top of a dashboard, where the camera 10 can be freely placed, a process of calibrating the camera 10 may be necessarily required to analyze the light-of-sight of the driver.

The calibrating of the camera 10 may indicate determining the relationship between the vehicle coordinate system and the camera coordinate system. The vehicle coordinate system refers to a 3D coordinate system in which randomly designated points such as the center point of a rear wheel, a specific point of the dash board and a specific point of the A-pillar are set to (0, 0, 0), and the camera coordinate system refers to a coordinate system in which the camera 10 is set to (0, 0, 0).

Therefore, the extrinsic parameters indicating the relationship between the two coordinates systems may be constituted by a group of a rotation matrix and a translation vector.

When the driver monitoring camera 10 in the driver state monitoring device is mounted at a fixed position through a screw or clip, the camera 10 may be located at a stationary position as a part of the vehicle. Therefore, the vehicle coordinate system and the camera coordinate system may not be changed from values which were set during the manufacturing process. However, the relationship between the camera coordinate system of the camera 10 installed at an unfixed place and the vehicle coordinate system may be changed whenever the camera 10 is moved.

Therefore, when a line-of-sight vector is derived through line-of-sight analysis, the line-of-sight vector may be calculated on the camera coordinate system. Thus, the camera coordinate system needs to be converted into the vehicle coordinate system in order to determine which portion of the vehicle the driver actually stares at.

As such, when the camera 10 is moved or the angle of the camera 10 is changed, the control unit 20 may determine that the driver stares at a different position from the previous calibrated state.

Therefore, although the camera 10 needs to be calibrated, the calibration between the vehicle coordinate system of the vehicle and the camera coordinate system is very difficult and inconvenient.

However, when only the angle of the camera 10 is simply adjusted at the fixed position, the problem can be simplified. That is, when the specification of the lens is fixed during design because a fixed focus camera is used as the camera 10, it may be considered that intrinsic parameters of the camera 10 are not changed regardless of the movement of the camera 10. Therefore, although the camera is moved, only the extrinsic parameters determining the relationship between the vehicle coordinate system (world coordinate system) and the camera coordinate system may be decided to calibrate the camera 10.

The vehicle state input unit 40 may receive a vehicle state such as a direction indication state or a vehicle speed state from a direction indicator switch 50 or a vehicle speed sensor 60.

Therefore, when the direction indication state or the vehicle speed state is inputted from the vehicle state input unit 40, the control unit 20 may detect the line-of-sight of the driver from the captured image, and calibrate the line-of-sight according to the vehicle state.

Typically, in order to calibrate the line-of-sight of the driver, an image of the driver who stares at several designated positions when the vehicle is stopped may be captured, and the angle of the line-of-sight may be extracted from the pupil information of the driver in the captured image and calibrated. In the present embodiment, however, the line-of-sight of the driver may be automatically calibrated during driving, in order to remove such inconvenience.

That is, when it is assumed that the driver operates the direction indicator switch 50 to the left and necessarily looks at the left side mirror at least once in the case that the driver intends to make a left turn during driving and when it is assumed that the driver operates the direction indicator switch 50 to the right and necessarily looks at the right side mirror at least once in the case that the driver intends to make a right turn during driving, a plurality of samples may be acquired even though the driver looks at the side mirror only for one second. Therefore, based on the acquired samples, the line-of-sight of the driver may be detected to calibrate the line-of-sight in the indication direction according to the direction indication state.

When the vehicle speed state is equal to or more than a preset vehicle speed, that is, when the vehicle travels at high speed, it may be assumed that the line-of-sight of the driver faces forward for most of time. Therefore, based on the assumption, the control unit 20 may detect the line-of-sight of the driver to calibrate the line-of-sight in the forward-looking direction.

As described above, the apparatus for calibrating the driver monitoring camera in accordance with the embodiment of the present invention may display the face detection state of the driver through the camera such that the driver can conveniently adjust the position of the camera while checking the face detection state, and calibrate the extrinsic parameters of the camera based on the background image of the interior of the vehicle, captured through the camera, thereby not only conveniently calibrating the relationship between the camera coordinate system and the vehicle coordinate system without a complicated procedure, but also automatically calibrating the line-of-sight of the driver according to the vehicle state during driving.

Figure 3:
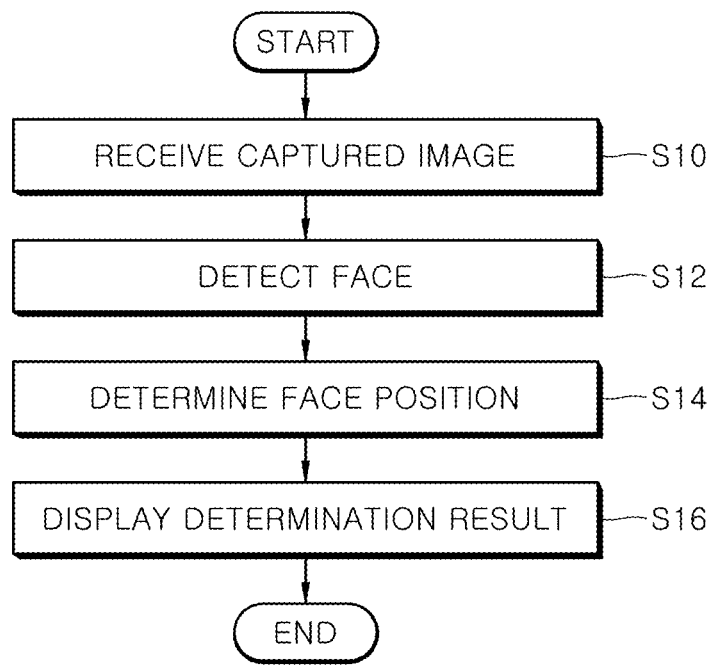
FIG. 3 is a flowchart for describing a method for calibrating a driver monitoring camera in accordance with a first embodiment of the present invention.

FIG. 3 is a flowchart for describing a method for calibrating a driver monitoring camera in accordance with a first embodiment of the present invention.

As illustrated in FIG. 3, the method for calibrating a driver monitoring camera in accordance with the first embodiment of the present invention may begin with step S10 in which the control unit 20 receives a captured image from the camera 10.

After receiving the captured image in step S10, the control unit 20 may detect the face of a driver from the captured image in step S12.

After detecting the face of the driver in step S12, the control unit 20 may determine the position of the face detected from the image in step S14.

That is, the control unit 20 may determine whether the face is positioned in the center or at the top or bottom of the image.

After determining the position of the face in step S14, the control unit 20 may display the position of the detected face as a vertical position through the display unit 30 as illustrated in FIG. 2, in step S16.

For example, when the position of the face is positioned in the center of the image, the middle LED of the display unit 30 may be turned on. Furthermore, when the position of the face is positioned at the top of the image, the upper LED of the display unit 30 may be turned on. Furthermore, when the position of the face is positioned at the bottom of the image, the lower LED of the display unit 30 may be turned on.

Therefore, the driver can adjust the angle of the camera 10 while checking whether the face is positioned in the center of the image captured through the camera 10 or at the top or bottom of the image, based on the turn-on state of the LED displayed on the display unit 30.

Figure 4:
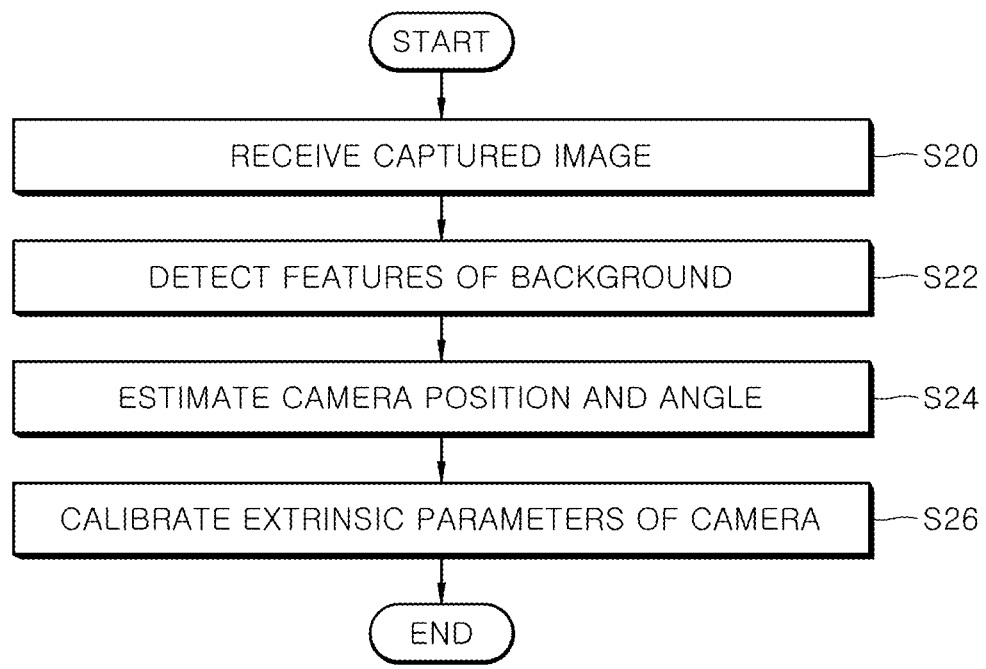
FIG. 4 is a flowchart for describing a method for calibrating a driver monitoring camera in accordance with a second embodiment of the present invention.

FIG. 4 is a flowchart for describing a method for calibrating a driver monitoring camera in accordance with a second embodiment of the present invention.

As illustrated in FIG. 4, the method for calibrating a driver monitoring camera in accordance with the second embodiment of the present invention may begin with step S20 in which the control unit 20 receives a captured image from the camera 10.

After receiving the captured image in step S20, the control unit 20 may detect features of the background from the captured image in step S22.

The features of the background may include one or more of a window frame, roof, B pillar, handle and fixed structure of the vehicle. When the features are detected as fixed structures in the vehicle through image processing, the angle of the camera 10 may be recognized.

Although the background is generally considered as unnecessary information, the apparatus and method in accordance with the present embodiment may detect the fixed structures in the vehicle through image processing. Therefore, the angle of the camera 10 may be recognized to determine extrinsic parameters indicating the relationship between the camera coordinate system and the vehicle coordinate system.

After detecting the features of the background in step S22, the control unit 20 may estimate the position and angle of the camera 10 based on the features in step S24.

After estimating the position and angle of the camera 10 in step S24, the control unit 20 may calibrate the camera 10 by calibrating the extrinsic parameters of the camera 10 according to the position and angle of the camera 10 in step S26.

FIG. 5 is a flowchart for describing a method for calibrating a driver monitoring camera in accordance with a third embodiment of the present invention.

As illustrated in FIG. 5, the method for calibrating a driver monitoring camera in accordance with the third embodiment of the present invention may begin with step S30 in which the control unit 20 determines a vehicle state.

The control unit 20 may receive a direction indication state and vehicle speed state from the direction indicator switch 50 or the vehicle speed sensor 60 through the vehicle state input unit 40, and determine the vehicle state.

When it is assumed that the driver operates the direction indicator switch 50 to the left and necessarily looks at the left side mirror at least once in the case that the driver intends to make a left turn during driving and when it is assumed that the driver operates the direction indicator switch 50 to the right and necessarily looks at the right side mirror at least once in the case that the driver intends to make a right turn during driving, a plurality of samples may be acquired even though the driver looks at the side mirror only for one second. Therefore, based on the acquired samples, the line-of-sight of the driver may be detected to calibrate the line-of-sight according to the direction indication state.

Furthermore, when the vehicle speed state is equal to or more than a preset vehicle speed, that is, when the vehicle travels at high speed, it may be assumed that the line-of-sight of the driver faces forward for most of time. Therefore, based on the assumption, the control unit 20 may detect the line-of-sight of the driver to calibrate the line-of-sight.

When the vehicle state is received in step S30, the control unit 20 may receive the captured image from the camera 10 in step S32.

After receiving the captured image in step S32, the control unit 20 may detect the line-of-sight of the driver from the captured image in step S34.

After detecting the line-of-sight of the driver in step S34, the control unit 20 may calibrate the line-of-sight in the indication direction when the vehicle state is the direction indication state, and calibrate the line-of-sight in the forward-looking direction when the vehicle state is the vehicle speed state equal to or more than the preset vehicle speed, in step S36.

As described above, the method for calibrating a driver monitoring camera in accordance with the embodiment of the present invention may display the face detection state of the driver through the camera such that the driver can conveniently adjust the position of the camera while checking the face detection state, and calibrate the extrinsic parameters of the camera based on the background image of the interior of the vehicle, captured through the camera, thereby not only conveniently calibrating the relationship between the camera coordinate system and the vehicle coordinate system without a complicated procedure, but also automatically calibrating the line-of-sight of the driver according to the vehicle state during driving.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. An apparatus for operating calibrating a driver monitoring camera, comprising:
    a camera configured to capture an image, wherein the captured image comprises a face of a driver and a background showing a feature of a vehicle;
    a control unit configured to receive the captured image from the camera, and detect the face to determine a face position; and
    a display configured to display determination of the face position by the control unit,
    wherein the control unit is further configured to:
        process the captured image to obtain a line-of-sight of the driver in a vehicle coordinate system using intrinsic parameters and at least an extrinsic parameter of the camera,
        analyze the line-of-sight, and
        provide a warning to the driver based on analysis of the line-of-sight,
    wherein the control unit is further configured to:
        when the camera moves, detect the feature shown in the background of the captured image,
        calibrate the extrinsic parameter of the camera based on the detected feature in the background, and
        calculate the line-of-sight based on the calibrated extrinsic parameter for correcting the line-of-sight based on the calibrated extrinsic parameter in response to movement of the camera such that the warning to the driver can be based on the line-of-sight.

2. The apparatus of claim 1, further comprising a reflecting body installed on a front surface of a lens of the camera.

3. The apparatus of claim 1, wherein the display configured to display a vertical position depending on the face position.

4. The apparatus of claim 1, wherein the extrinsic parameter comprises information on position and angle of the camera in the vehicle coordinate.

5. The apparatus of claim 1, wherein the feature comprises one or more of a window frame, a roof, a B-pillar, a handle and a fixed structure of the vehicle.

6. The apparatus of claim 1, further comprising a vehicle state input unit configured to input a vehicle state,
    wherein the control unit detects the line-of-sight of the driver from the captured image when a direction indication state or a vehicle speed state is inputted from the vehicle state input unit, and calibrates the line-of-sight according to the vehicle state.

7. The apparatus of claim 6, wherein the control unit calibrates the line-of-sight in an indication direction when the vehicle state is the direction indication state.

8. The apparatus of claim 6, wherein the control unit calibrates the line-of-sight in a forward-looking direction when the vehicle state is the vehicle speed state equal to or more than a preset vehicle speed.

9. A method of operating a driver monitoring camera, comprising:
receiving a captured image from a camera, wherein the captured image comprises a driver's face and a background showing a feature of a vehicle;
processing the captured image to obtain a line-of-sight of a driver in a vehicle coordinate system using intrinsic parameters and at least an extrinsic parameter of the camera;
analyzing the line-of-sight;
providing a warning to the driver based on analysis of the line-of-sight;
detecting the face from the captured image;
determining a position of the detected face; and
displaying determination on a display according to the position of the detected face,
wherein the method further comprises:
when the camera moves, detecting the feature in the background of the captured image,
calibrating the extrinsic parameter of the camera based on the detected feature in the background, and
calculating the line-of-sight based on the calibrated extrinsic parameter for correcting the line-of-sight based on the calibrated extrinsic parameter in response to movement of the camera such that the warning to the driver can be based on the line-of-sight.

10. The method of claim 9, wherein in the displaying of the determination result, a vertical position depending on the position of the face is displayed.

11. A method of operating a driver monitoring camera, comprising:
receiving a captured image from a camera, wherein the captured image comprises a driver's face and a background showing a feature of a vehicle;
processing the captured image to obtain a line-of-sight of a driver in a vehicle coordinate system using intrinsic parameters and at least an extrinsic parameter of the camera;
analyzing the line-of-sight;
providing a warning to the driver based on analysis of the line-of-sight;
when the camera moves, detecting the feature shown in the background from the captured image;
calibrating the extrinsic parameter of the camera based on the feature in the background; and
calculating the line-of-sight based on the calibrated extrinsic parameter for correcting the line-of-sight based on the calibrated extrinsic parameter in response to movement of the camera such that the warning to the driver can be based on the line-of-sight.

12. The method of claim 11, wherein the extrinsic parameter of the camera indicates the relationship between a vehicle coordinate system and a camera coordinate system.

13. The method of claim 11, wherein the features of the background comprise one or more of a window frame, a roof, a B-pillar, a handle and a fixed structure of the vehicle.

14. A method of operating a driver monitoring camera, comprising:
receiving a captured image from a camera, wherein the captured image comprises a driver's face and a background showing a feature of a vehicle;
processing the captured image to obtain a line-of-sight of a driver in a vehicle coordinate system using intrinsic parameters and at least an extrinsic parameter of the camera;
analyzing the line-of-sight;
providing a warning to the driver based on analysis of the line-of-sight;
when the camera moves, detecting the feature in the background of the captured image,
calibrating the extrinsic parameter of the camera based on the detected feature in the background, and
calculating the line-of-sight based on the calibrated extrinsic parameter for correcting the line-of-sight based on the calibrated extrinsic parameter in response to movement of the camera such that the warning to the driver can be based on the line-of-sight
wherein the method further comprises:
detecting a line-of-sight of a driver from the captured image for determining the line-of-sight in a predetermined direction based on the vehicle state.

15. The method of claim 14, wherein when the vehicle state is a direction indication state, the predetermined direction is an indication direction.

16. The method of claim 14, wherein, when the vehicle state is a vehicle speed state equal to or more than a preset vehicle speed, the predetermined direction is a forward-looking direction.

* * * * *